(12) United States Patent
Huebner et al.

(10) Patent No.: US 7,478,504 B2
(45) Date of Patent: Jan. 20, 2009

(54) WALL SYSTEM, MOUNTING PLATE AND INSERT

(75) Inventors: Fritz Huebner, Holland, MI (US); Kelly Van Koevering, Zeeland, MI (US)

(73) Assignee: Plascore, Inc., Zeeland, MI (US)

( * ) Notice: Subject to any disclaimer, the term of this patent is extended or adjusted under 35 U.S.C. 154(b) by 0 days.

(21) Appl. No.: 10/213,589

(22) Filed: Aug. 7, 2002

(65) Prior Publication Data

US 2004/0025459 A1 Feb. 12, 2004

(51) Int. Cl.
*E04H 1/12* (2006.01)
*E04H 1/06* (2006.01)

(52) U.S. Cl. .................. 52/238.1; 52/239; 52/36.6; 403/11; 403/16; 248/222.51

(58) Field of Classification Search .................. 52/36.1, 52/36.6, 281, 282.1, 239, 284, 582, 584, 52/79.9, 238.1, 698; 160/130, 351, 381, 160/368.1, 135; 248/222.51, 222.52, 222.13, 248/228.2; 403/11, 12, 13, 14, 15, 16, 17, 403/18, 19, 20, 21, 22

See application file for complete search history.

(56) References Cited

U.S. PATENT DOCUMENTS

| | | | | |
|---|---|---|---|---|
| 1,271,210 A | * | 7/1918 | Otte | 52/211 |
| 2,574,350 A | * | 11/1951 | Peelle | 52/213 |
| 2,598,139 A | * | 5/1952 | Shea | 52/211 |
| 2,700,441 A | * | 1/1955 | Cudini | 52/214 |
| 2,872,144 A | * | 2/1959 | Hobson | 248/223.41 |
| 3,080,980 A | * | 3/1963 | Gibbons | 248/222.52 |
| 3,103,263 A | * | 9/1963 | Leeser | 52/213 |
| 3,282,006 A | * | 11/1966 | Halsey et al. | 52/781 |
| 3,425,171 A | * | 2/1969 | Kelley et al. | 160/135 |
| 3,429,601 A | * | 2/1969 | Bremers | 403/230 |
| 3,451,183 A | * | 6/1969 | Lespagnol et al. | 52/656.1 |
| 3,513,606 A | * | 5/1970 | Jones | 52/27 |
| 3,559,357 A | * | 2/1971 | Lowe | 52/282.4 |
| 3,624,780 A | * | 11/1971 | Elliott et al. | 211/107 |
| 3,636,672 A | * | 1/1972 | Fink | 52/214 |

(Continued)

FOREIGN PATENT DOCUMENTS

EP  0458069  1/1994

OTHER PUBLICATIONS

ITEM International, MB Building Kit System 5 Electronic Catalog, 2002, pp. 110, 111, 126, 130 and 131.

*Primary Examiner*—Phi D. A
(74) *Attorney, Agent, or Firm*—Price, Heneveld, Cooper, DeWitt & Litton LLP

(57) ABSTRACT

An assembly for a framed system includes an elongated post and a mounting plate shaped for installation in a post channel of the elongated post. The elongated post includes a first rib integrated along an inner surface of the first lateral side and an elongated second rib integrated along an inner surface of the second lateral side. The mounting plate includes an aperture for receiving the fastener and includes a first slot for receiving the first rib and a second slot for receiving the second rib. When the mounting plate is installed in the post channel, the first and second ribs are deformed by the installation of the mounting plate such that the deformed first and second ribs retain the mounting plate in the post channel.

30 Claims, 12 Drawing Sheets

U.S. PATENT DOCUMENTS

| | | | |
|---|---|---|---|
| 3,749,432 A * | 7/1973 | Janssen | 52/476 |
| 3,837,128 A * | 9/1974 | O'Brien | 52/241 |
| 3,866,364 A * | 2/1975 | Pollard | 52/36.5 |
| 3,989,399 A * | 11/1976 | Slowbe | 403/245 |
| 4,047,342 A * | 9/1977 | Boulva | 52/239 |
| 4,382,710 A * | 5/1983 | Slowbe | 403/252 |
| 4,443,979 A * | 4/1984 | Varon et al. | 52/36.6 |
| 4,443,986 A * | 4/1984 | Propst et al. | 52/239 |
| 4,519,511 A * | 5/1985 | Mendenhall | 211/187 |
| 4,625,483 A * | 12/1986 | Zacky et al. | 52/239 |
| 4,873,804 A * | 10/1989 | Kukke | 52/217 |
| 4,881,349 A | 11/1989 | Brown et al. | |
| 4,914,873 A * | 4/1990 | Newhouse | 52/36.1 |
| 4,984,400 A | 1/1991 | Bockmiller | |
| 5,307,596 A | 5/1994 | Bockmiller | |
| 5,371,981 A | 12/1994 | Bockmiller | |
| 5,414,967 A | 5/1995 | Cates et al. | |
| 5,634,300 A * | 6/1997 | Huebner et al. | 52/36.1 |
| 5,640,816 A * | 6/1997 | Reiland et al. | 52/239 |
| 5,669,198 A | 9/1997 | Ruff | |
| 5,729,867 A * | 3/1998 | Carmichael | 16/225 |
| 5,806,820 A * | 9/1998 | Simon | 248/243 |
| 5,893,538 A * | 4/1999 | Onishi et al. | 248/65 |
| 6,016,632 A | 1/2000 | McGee et al. | |
| 6,088,980 A * | 7/2000 | Gulliver | 52/239 |
| 6,155,014 A | 12/2000 | Wagner | |
| 6,209,275 B1 | 4/2001 | Cates et al. | |
| 6,295,764 B1 * | 10/2001 | Berridge et al. | 52/36.5 |
| 6,599,055 B2 * | 7/2003 | Auer et al. | 403/381 |
| 2001/0007186 A1 | 7/2001 | Cates et al. | |

\* cited by examiner

WALL SYSTEM, MOUNTING PLATE AND INSERT

BACKGROUND OF THE INVENTION

The present invention is generally directed to a framed system and, more specifically, to an assembly for a framed system.

Various manufacturers of extruded metal products have produced metal posts, e.g., aluminum posts, with various cross-sectional configurations, which are designed to interfit with metal panels, the combination of which, when assembled, provides one or more walls for a room of a building, such as a clean room. At least one manufacturer has produced a metal post with a T-slot in at least one of its faces. An example of one wall system that has implemented a post and batten assembly is described in U.S. Pat. No. 5,634,300, entitled "Wall System Employing Grooved Posts, Connector Blocks and T-Bolt Receiving Battens" to Fritz Huebner et al., which is hereby incorporated herein by reference in its entirety.

U.S. Pat. No. 5,634,300 discloses an elongated batten that has a central body, which is positioned in an elongated groove of a post and attached to the post with fasteners. The disclosed batten also includes a pair of flanges that extend from the central body opposite each other. The central body includes an elongated cavity that includes a pair of inner shoulders, which define a T-slot in the batten, which is designed to receive a T-bolt fastener. In an assembly using post and battens, as described above, a connector block attached to one end of a post is utilized to orthogonally connect a horizontal post to a vertical post in a T-pattern and may be used to connect a vertical post to a floor track at one end and may be used to connect the vertical post to a header track at an opposite end.

The connector block is attached to an end of a post with a plurality of fasteners and is configured to receive a head of a T-bolt, whose associated T-nut is captured in a T-slot of an orthogonal post, floor track and/or header track. Configuration of the battens to include a T-slot allows work components, such as work surfaces, computer modules, desks, shelving, lighting or other such devices to be mounted to the battens, which also secure a panel to a post.

The post and batten configuration disclosed in U.S. Pat. No. 5,634,300 is particularly advantageous if a different color or style panel is to be substituted in that the battens can be readily removed for repainting or substitution of different color battens without requiring removal of the posts, which form a frame structure. Thus, such a post and batten configuration allow a user to easily create an aesthetically matching system without having to paint or anodize the posts of the system or dismount and later reassemble the entire structure. Further, such a system allows horizontal posts to be connected to vertical posts through the use of the above-described connector block, which attaches to an end of a post and uses conventional T-bolts to provide a relatively easily constructed wall.

While such a wall system employing grooved posts, connector blocks and T-bolt receiving battens provides a useful wall system, many potential customers require lower cost wall systems than can generally be readily constructed using posts and connectors described in U.S. Pat. No. 5,634,300 and do not require full functionality in many applications. That is, many customers do not require the capability of mounting objects from a face of the wall and may not require fully adjustable horizontal posts.

Thus, it would be desirable to provide a framed system that is generally lower in cost than currently available framed systems. Further, in many applications it would be desirable to provide a framed system that is lower in cost and that does not provide for full adjustment of posts implemented horizontally. In various applications, it would also be desirable to provide a low cost framed system whose battens do no include a T-slot for the mounting of objects from the front surface of the wall system.

SUMMARY OF THE INVENTION

An embodiment of the present invention is directed to an assembly for a framed system that includes an elongated post and a mounting plate. The elongated post includes a front side, a rear side opposite the front side, a first lateral side and a second lateral side opposite the first lateral side. The front and rear sides and the first and second lateral sides of the elongated posts define a post channel. The elongated post includes an elongated first rib integrated along an inner surface of the first lateral side and an elongated second rib integrated along an inner surface of the second lateral side. The mounting plate is shaped for installation in the post channel and includes an aperture for receiving a fastener. The mounting plate also includes a first slot for receiving the first rib and a second slot for receiving the second rib such that the first and second ribs are deformed by the installation of the mounting plate in the post channel and the deformed first and second ribs retain the mounting plate in the post channel.

According to another embodiment of the present invention, an assembly for a framed system includes an elongated post and a mounting plate shaped for installation in a post channel of the elongated post. The elongated post includes a front side, a rear side opposite the front side, a first lateral side and a second lateral side opposite the first lateral side. The front and rear sides and the first and second lateral sides define the post channel. A first slot is formed in an end of the post on the first lateral side and a second slot is formed in the end of the post on the second lateral side. The mounting plate includes an aperture for receiving a fastener and also includes a first tab for insertion into the first slot and a second tab for insertion into the second slot. The first and second tabs are deformed by the installation of the mounting plate in the post channel such that the deformed first and second tabs retain the mounting plate in the post channel.

According to yet another embodiment of the present invention, an assembly for a framed system includes an elongated post and a first insert. The elongated post includes a front side, a rear side opposite the front side, a first lateral side and a second lateral side opposite the first lateral side. The rear side of the elongated post and the portions of the first and second lateral sides define a portion of a post channel. A first elongated lateral pocket is formed in the first lateral side and includes a first opening that defines a first elongated slot in the first lateral side. The first insert is shaped to be installed into the first elongated lateral pocket and includes an aperture for receiving a T-bolt for attaching the elongated post to another structure, which includes a T-slot for receiving a T-nut that threadingly engages the T-bolt whose head is retained by the first insert. The first elongated slot is sized to receive the head of the T-bolt.

According to still another embodiment of the present invention, the elongated post includes a second elongated lateral pocket formed in the second lateral side and includes a second opening in the second elongated lateral pocket that provides a second elongated slot in the second lateral side of the elongated post. In this embodiment, the insert is shaped to be installed into either of the first and second elongated lateral pockets.

These and other features, advantages and objects of the present invention will be further understood and appreciated by those skilled in the art by reference to the following specification, claims and appended drawings.

DETAILED DESCRIPTION OF THE PREFERRED EMBODIMENT(S)

The present invention is directed to a number of assemblies for a framed system that, in general, can be utilized to reduce the total cost of the framed system. The assemblies for the framed system may include a number of different elongated posts that can be utilized to reduce the cost of the framed system. According to one embodiment of the present invention, the elongated post includes an elongated first rib integrated along an inner surface of a first lateral side and an elongated second rib integrated along an inner surface of a second lateral side that is opposite the first lateral side. A front side, a rear side and the first and second lateral sides of the elongated post defines a post channel, which receives an associated mounting plate.

The mounting plate includes an aperture for receiving a fastener for attaching the elongated post to another structure and includes a first slot for receiving the first rib and a second slot for receiving the second rib. The first and second ribs are deformed by the installation of the mounting in the post channel such that the deformed first and second ribs retain the mounting plate in the post channel. The first and second slots may be formed at an angle with respect to a face of the mounting plate within a range of about thirty to sixty degrees.

According to another embodiment of the present invention, an assembly for a framed system includes an elongated post that has a first elongated lateral pocket formed in a first lateral side with a first opening in the first elongated lateral pocket defining a first elongated slot in the first lateral side. An insert, which is shaped to be installed, e.g., threaded or driven, in the first elongated lateral pocket, includes an aperture for receiving a T-bolt for attaching the elongated post to another structure, e.g., another elongated post and/or a floor track, which includes a T-slot for receiving a T-nut that threadingly engages the T-bolt, whose head is retained by the insert.

The insert may take any of a number of forms, which includes, but is not limited to, the embodiments shown in FIGS. 4A-4E. It should be appreciated that depending upon the construction of the elongated lateral pocket formed in the lateral side of the elongated post, an exterior of the insert may include threads or may include a plurality of ribs. When the exterior of the insert is threaded, the insert is threaded into the elongated lateral pocket with an insertion tool, such as the tool shown in FIG. 3C. It should be appreciated that the elongated lateral pocket can be shaped such that it can receive an insert with external ribs, which deform an interior surface of the elongated lateral pocket when driven into the pocket such that the insert is retained within the pocket. It is also contemplated that the outer profile of the insert may take cross-section shapes other than circular, e.g., rectangular and square.

Figure 1:
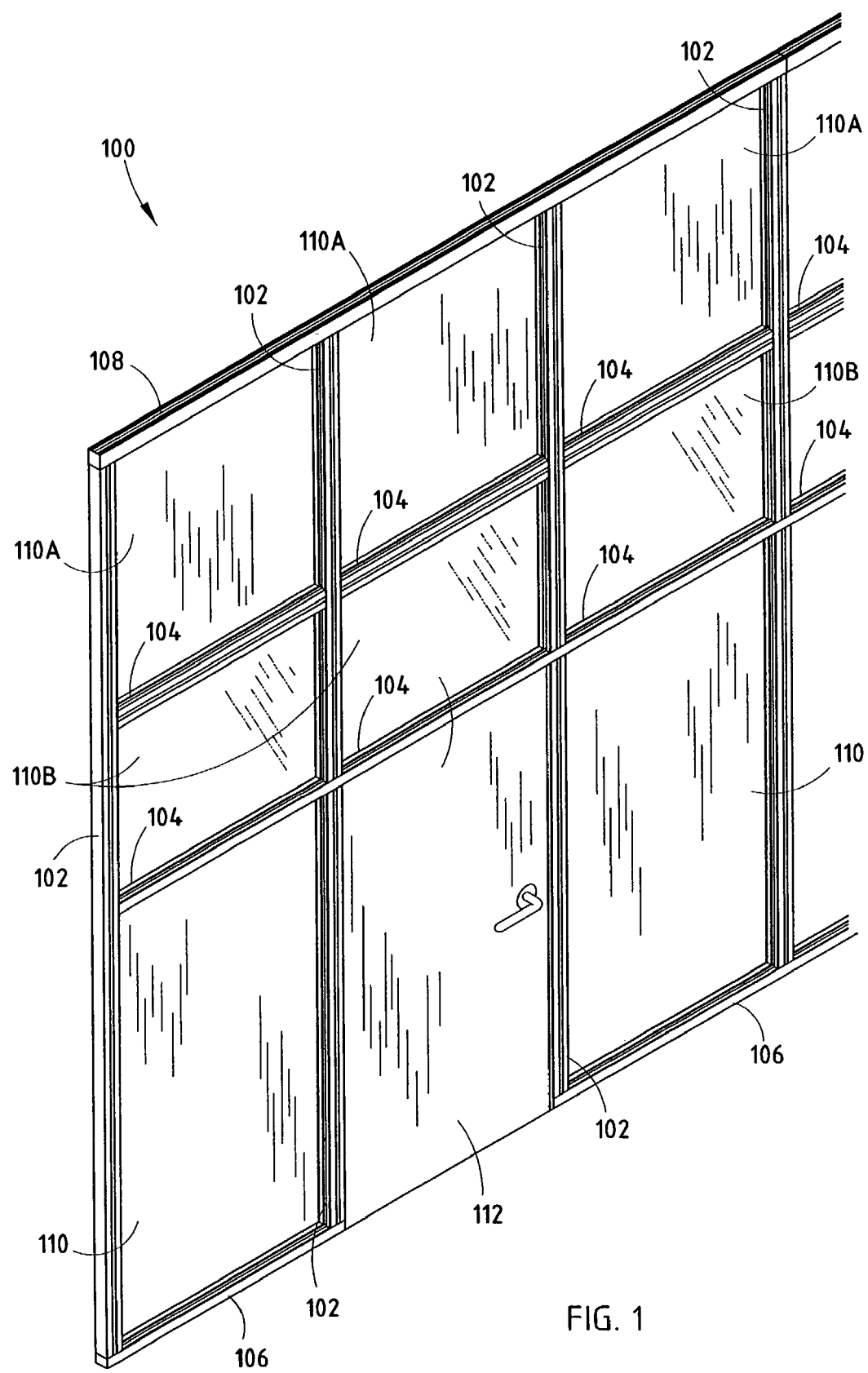
FIG. 1 is a front view of a wall system, which utilizes elongated posts constructed according to one or more embodiments of the present invention.

Turning to FIG. 1, an exemplary wall system 100 is depicted which includes a plurality of panels 110, 110A and 110B, which are retained by assemblies including vertical posts 102 and horizontal posts 104, which may be of varying lengths and may be constructed according to one or more of the embodiments disclosed herein. As shown in FIG. 1, a door 112 is mounted within the wall system 100 to allow access from one side of the wall to the other. A head track 108 (see FIGS. 7A-7B) may be employed that slides onto and seals a top of the wall 100 approximate an upper end of the posts 102 and upper panels 110A. It should be appreciated that the elongated posts 102 and 104 of the wall system 100 may be arranged in a number of different ways and may have the same cross-sectional form.

Figure 2A:
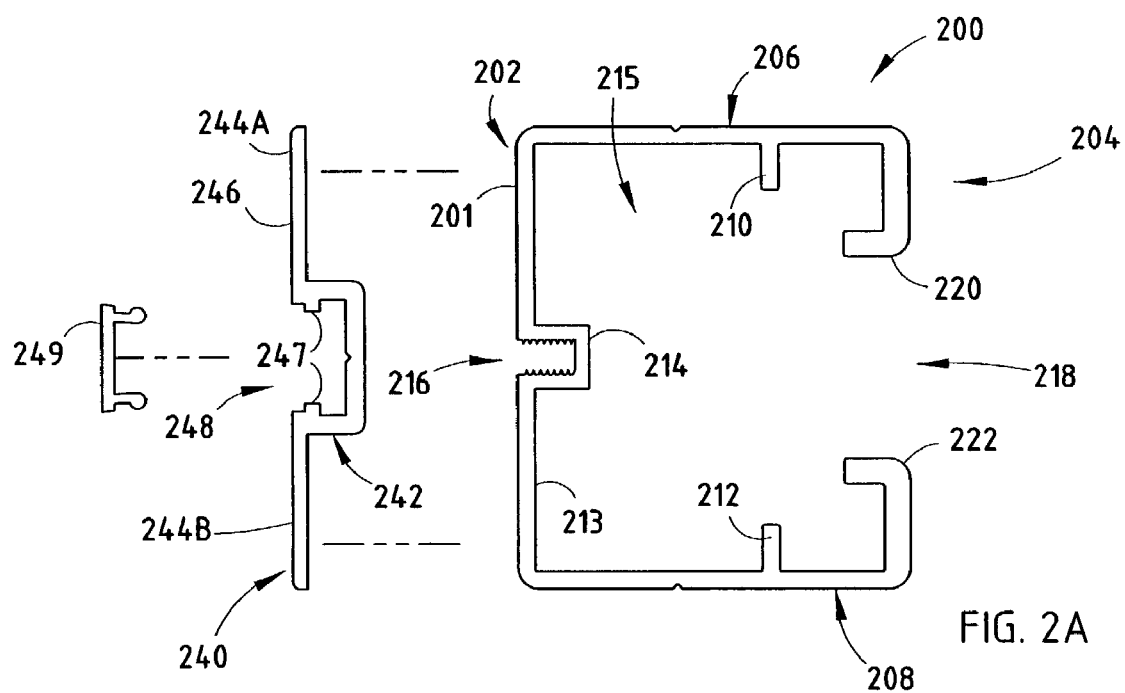
FIG. 2A is a cross-sectional view of an elongated post and batten constructed, according to one embodiment of the present invention.

FIG. 2A depicts a cross-sectional view of an elongated post 200, constructed according to one embodiment of the present invention, that, when utilized, provides a relatively low cost system, when compared to currently commercially available post and batten systems. The post 200 may be implemented as a horizontal or a vertical post and includes a front side 202, a rear side 204 opposite the front side 202, a first lateral side 206 and a second lateral side 208 opposite the first lateral side 206. The front side 202, the rear side 204, and the first and second lateral sides 206 and 208 define a post channel 215, which will be further described below in conjunction with mounting plates 250 and 250A (see FIG. 2C-2D), which are shaped to be received in the post channel 215. As is shown, the elongated post 200 includes an elongated first rib 210 integrated along an inner surface of the first lateral side 206 and an elongated second rib 212 integrated along an inner surface of the second lateral side 208 that is opposite the first lateral side 206.

Figure 2B:
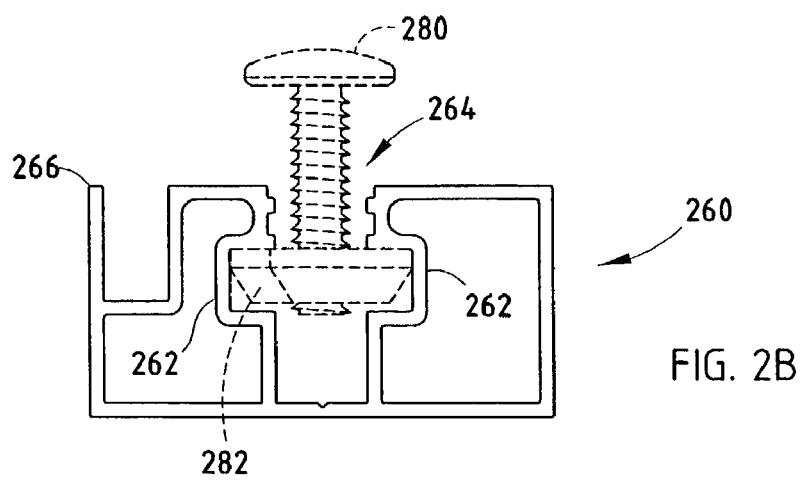
FIG. 2B is a cross-sectional view of a floor track for use with the elongated post of FIG. 2A.
Figure 2C:
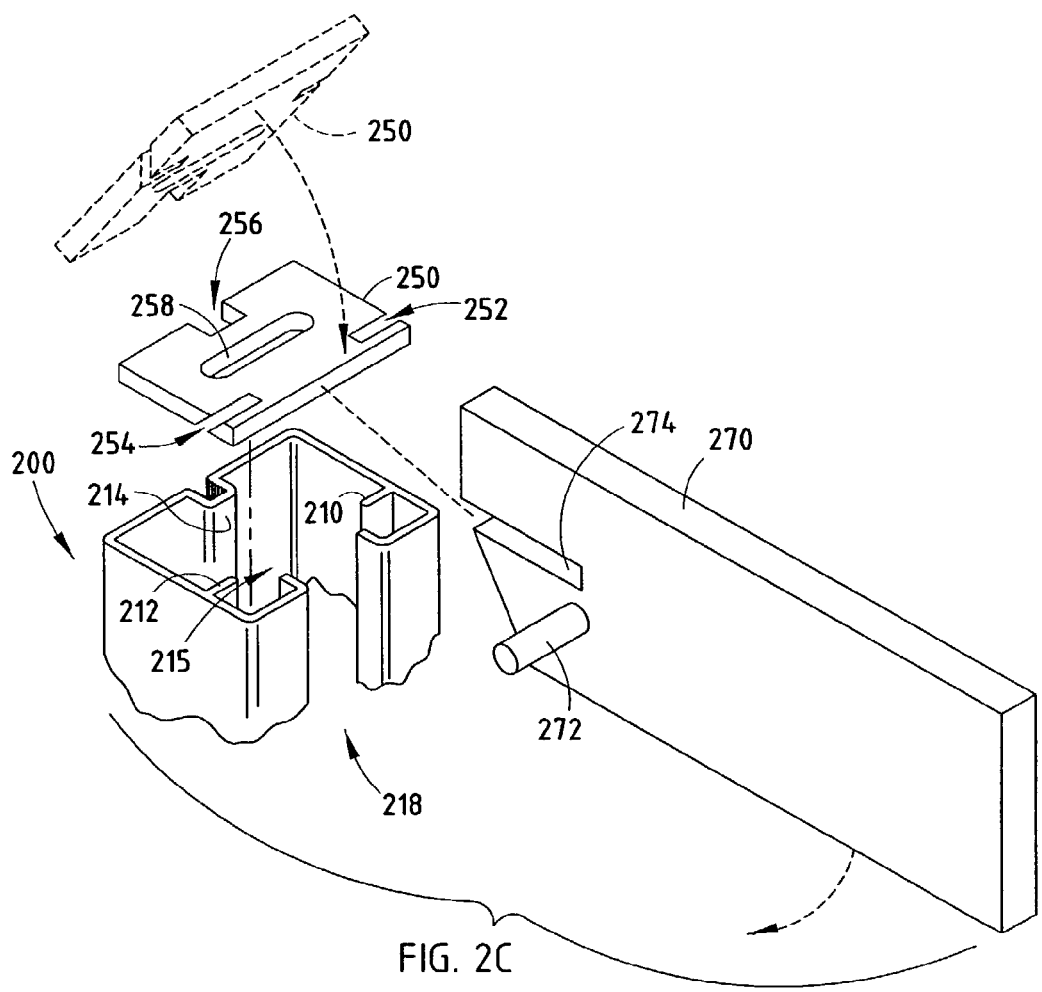
FIG. 2C is an exploded perspective view of a mounting plate and a tool for inserting the mounting plate within a post channel of the post of FIG. 2A.

With reference to FIG. 2C, the mounting plate 250 includes a first attachment slot 252 and a second attachment slot 254. The first and second slots 252 and 254 may be formed at an angle, e.g., forty-five degrees, with respect to a face of the mounting plate 250 and the angle may, for example, range between about thirty and sixty degrees. Referring back to FIG. 2A, an inner surface 213 of the front side 202 of the elongated post 200 includes a centrally positioned integrated attachment rib 214, which defines an attachment channel 216, which may be threaded. The attachment channel 216 opens to an outer surface 201 of the front side 202 of the elongated post 200. With reference to FIG. 2C, when the mounting plate 250 is implemented within posts formed according to the post 200, which includes the integrated attachment rib 214, the mounting plate 250 includes an attachment slot 256, which is shaped to receive the integrated attachment rib 214.

As is also shown in cross-section in FIG. 2A, an elongated batten 240 includes a central body 242 and a pair of batten flanges 244A and 244B extending from a front face 246 of the central body 242 in opposite directions and a plurality of apertures for receiving fasteners which thread into the attachment channel 216 of the elongated post 200 and, thus, affix the elongated batten 240 to the elongated post 200. As is shown, the elongated batten 240 includes an elongated opening 248 in the front face of the central body 242, located between the pair of batten flanges 244A and 244B. Also shown is a flexible elongated cap 249, which includes a pair of parallel resilient fingers that engage posts 247 formed in the elongated opening 248. The posts 247 serve to retain the cap 249 such that the heads of fasteners that are utilized to attach the batten 240 to the post 200 are not visible, when the cap 249 is installed in the elongated opening 248.

As is also shown in FIG. 2A, the rear side 204 of the elongated post 200 is formed with an elongated rear side opening 218, defined by inwardly extending rear flanges 220 and 222. The rear side elongated opening 218 is sized to receive a mounting tool for installation of the mounting plate 250 in the post channel 215.

FIG. 2B depicts a cross-section of a floor track 260 that may be utilized in conjunction with a vertically oriented one of the posts 200, which includes a mounting plate 250 installed therein. The floor track 260 includes a floor track central body 262, with a central opening 264 and a floor track flange 266 defining a space for receiving a panel. The central opening 264 of the central body 262 is shaped to receive a T-nut 282, which threadingly receives a T-bolt 280 routed through the aperture 258 in the mounting plate 250 and into the central opening 264 for securing the elongated post 200 to the floor track 260. Alternatively, the mounting plate 250 may include a mounting stand extending therefrom to attach the post 200 to another structure.

Referring again to FIG. 2C, an end of the post 200, the mounting plate 250 and an installation tool 270 are depicted. A stop 272 extends through a surface of the tool 270 and provides an indication to an installer when the mounting plate 250 is properly oriented in the post channel 215. As is previously discussed, the mounting plate 250, which may include an attachment slot 256 (that is if the post 200 includes an attachment rib 214), includes first and second slots 252 and 254. To install the mounting plate 250 within the post channel 215 of the post 200, an installer aligns the second slot 254 with the second rib 212 and the first slot 252 with the first rib 210.

Then, the installer positions the attachment slot 256 edge of the mounting plate 250 into the post channel 215, such that the mounting plate 250 extends an appropriate depth into the post channel 215 with the edge of the mounting plate 250 opposite the attachment slot 256 edge extending out of the post channel 215. Next, a user inserts a front portion of the tool 270 into the opening 218 to engage the mounting plate 250, in slot 274 of the mounting tool 270. The installer then applies a force to the mounting tool 270 to rotate the mounting plate 250 to a horizontal position within the post channel 215, thus, deforming the first and second ribs 210 and 212 and providing tension to retain the mounting plate 250 within the post channel 215 of the post 200. Alternatively, the mounting plate 250 may be flipped over with the attachment slot 256 edge of the mounting plate 250 being rotated into the post channel 215.

Figure 2D:
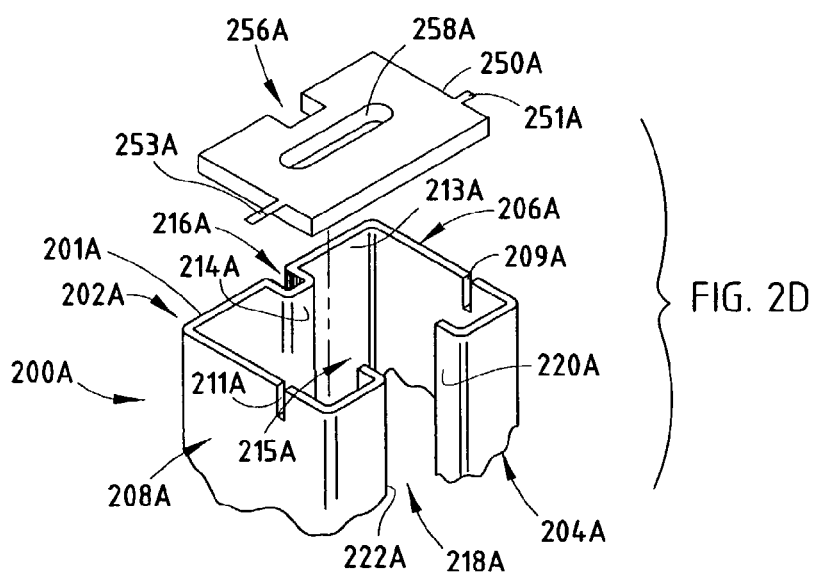
FIG. 2D is an exploded perspective view of a mounting plate and post, according to an alternative embodiment.

FIG. 2D depicts a mounting plate 250A and an elongated post 200A, constructed according to another embodiment of the present invention, that, when utilized, also provides a relatively low cost system when compared to currently commercially available post and batten systems. The post 200A may be implemented as a horizontal or a vertical post and includes a front side 202A, a rear side 204A opposite the front side 202A, a first lateral side 206A and a second lateral side 208A opposite the first lateral side 206A. The front side 202A, the rear side 204A, and the first and second lateral sides 206A and 208A define a post channel 215A, which is shaped to receive a mounting plate 250A.

The mounting plate 250A includes a first attachment tab 251A and a second attachment tab 253A. The first and second tabs 251A and 253A may be formed at an angle, e.g., forty-five degrees, with respect to a face of the mounting plate 250A and the angle may, for example, range between about thirty and sixty degrees. As shown, an inner surface 213A of the front side 202A of the elongated post 200A includes an integrated attachment rib 214A, which defines an attachment channel 216A, which may be threaded. The attachment channel 216A opens to an outer surface 201A of the front side 202A of the elongated post 200A. When the mounting plate 250A is implemented with a post that includes an integrated attachment rib, the mounting plate 250A includes an attachment slot 256A, which is shaped to receive the integrated attachment rib 214A.

The rear side 204A of the elongated post 200A is formed with an elongated rear side opening 218A, defined by inwardly extending rear flanges 220A and 222A. The rear side elongated opening 218A is sized to receiving a mounting tool for installation of the mounting plate 250A in the post channel 215A. To install the mounting plate 250A within the post channel 215A of the post 200A, an installer aligns the second tab 253A with the second slot 211A and the first tab 251A with the first slot 209A. Next, the installer positions the attachment slot 256A edge of the mounting plate 250A into the post channel 215A, such that the mounting plate 250A extends an appropriate depth into the post channel 215A with the edge of the mounting plate 250A opposite the attachment slot 256A edge extending out of the post channel 215A. Then, the installer inserts a portion of the tool 270 into the opening 218A to engage the mounting plate 250A, in the slot 274 of the mounting tool 270. The installer then applies a force to the mounting tool 270 to rotate the mounting plate 250A to a horizontal position within the post channel 215A, thus, deforming the first and second tabs 251A and 253A and providing tension to retain the mounting plate 250A within the post channel 215A of the post 200A. Alternatively, the plate 250A may be flipped over with the attachment slot 256A edge of the mounting plate 250A being rotated into the post channel 215A. The mounting plate 250A may include aperture 258A or, alternatively, the mounting plate 250A may include a mounting stand extending therefrom to attach the post 200A to another structure.

Figure 2E:
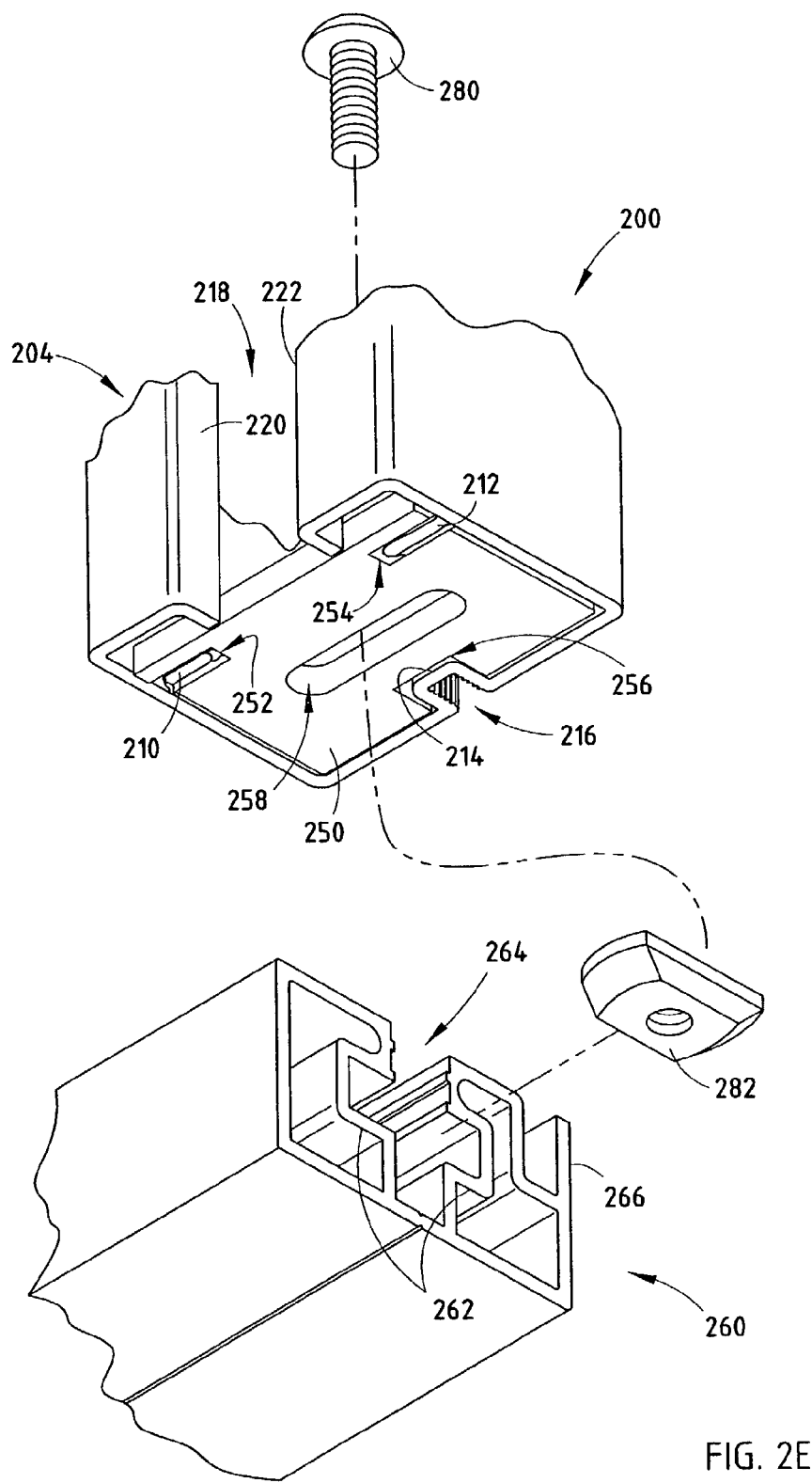
FIG. 2E is an exploded perspective view illustrating the attachment of the post of FIG. 2A, which includes a mounting plate installed therein, to the floor track of FIG. 2B through the utilization of a T-bolt fastener.

As is shown in FIG. 2E, when the post 200 is implemented as a vertical post, a T-bolt 280 is routed through the aperture 258 in the mounting plate 250, which is installed within the post 200, and a T-nut 282 is positioned within the central body 262 of the floor track 260. The T-bolt 280 is then threaded into the T-nut 282 an appropriate distance at which point the T-nut 282 is guided into the central body 262 of the floor track 260 and when the post 200 is positioned appropriately with respect to the floor track 260, a tightening tool, e.g., a slotted screw driver or allen wrench, is inserted into the head of the T-bolt 280 and the T-bolt 280 is rotated to affix the post 200 to the floor track 260.

Figure 3A:
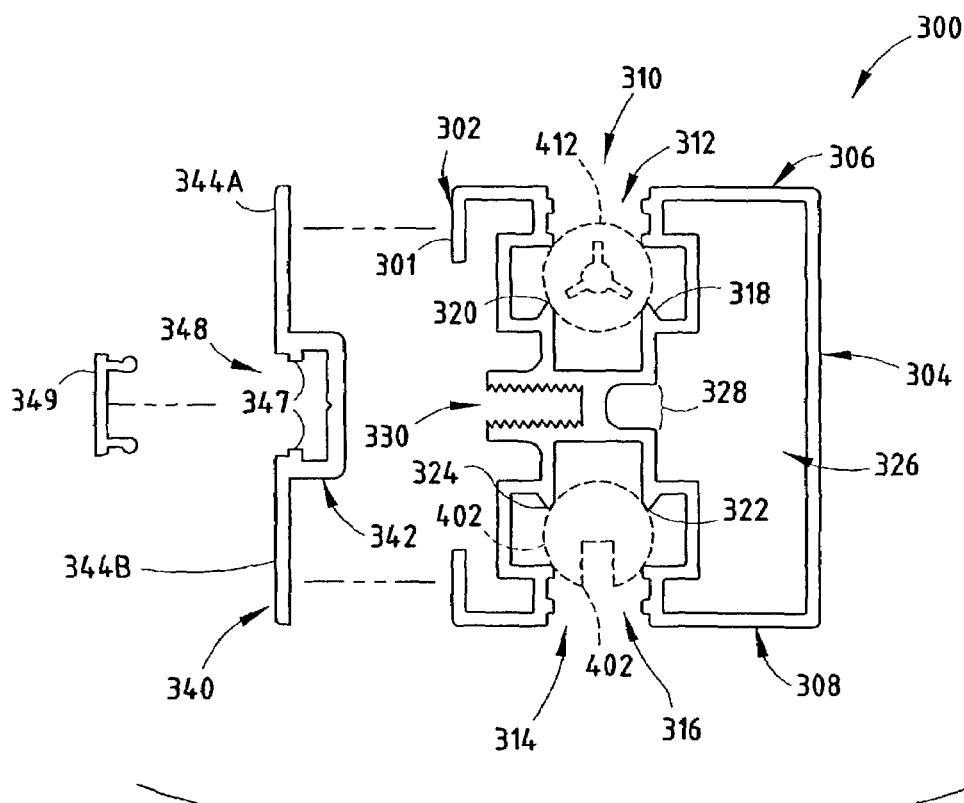
FIG. 3A is a cross-sectional view of an elongated post that includes two elongated lateral pockets for receiving inserts, according to another embodiment of the present invention.

FIG. 3A depicts a cross-sectional view of an assembly for a framed system that includes an elongated post 300 that has a front side 302, a rear side 304 opposite the front side 302, a first lateral side 306 and a second lateral side 308 opposite the first lateral side 306. As is shown in FIG. 3, the rear side 304 and portions of the first and second lateral sides 306 and 308 define a portion of a post channel 326. As is also shown in FIG. 3A, a first elongated lateral pocket 310 is formed in the first lateral side 306 and includes an opening that defines an elongated slot 312 in the first lateral side 306.

According to the present invention, the assembly also includes an insert (see FIGS. 4A-4E) that is shaped to be installed into the first elongated lateral pocket 310, which may take any number of forms depending upon the type of insert utilized. For example, an insert 412, which is shown installed in the pocket 310, includes an aperture sized for clearance to slidingly receive a threaded T-bolt for attaching the elongated post 300 to another structure, which includes a T-slot for receiving a T-nut that threadably engages the T-bolt whose head is retained by the insert 412. The first elongated slot 312 in the post 300 is sized to provide clearance for receiving the head of the T-bolt to allow the T-bolt to be inserted into and through the aperture in the insert 412.

As is also shown in FIG. 3A, the elongated post 300 may also include a second elongated lateral pocket 314 formed in the second lateral side 308. A second opening in the second elongated lateral pocket 314 provides a second elongated slot 316 in the second lateral side 308 of the elongated post 300. The second elongated lateral pocket 314 may also receive an insert, e.g., insert 402 as is shown in dashed lines.

The elongated post 300, also includes an integrated attachment rib 328 that is recessed from an outer surface 301 of the front side 302 of the elongated post 300. The integrated attachment rib 328 joins the first and second elongated lateral pockets 310 and 314 and includes an attachment channel 330 (e.g., a threaded channel), which opens toward the front side 302 of the elongated post 300. The assembly includes an elongated batten 340, which has a central body 342 with a plurality of apertures for receiving fasteners and a pair of batten flanges 344A and 344B extending from the central body 342 in opposite directions. The apertures of the elongated batten 340 receive fasteners, which thread into the attachment channel 330 of the elongated post 300, that affix the elongated batten 340 to the elongated post 300 and in this manner retain panels on one or both of the gaps between the front side 302 of the post 300 and the flanges 344A and 344B of the batten 340. As is shown in FIG. 3A, an elongated cap 349 made of a resilient material, e.g., plastic, includes a pair of parallel flexible fingers, which engage retaining posts 347, formed in the central body 342 of the batten 340. The elongated cap 349, when installed, obscures view of the fasteners that are routed through the apertures in the batten 340 to attach the batten 340 to the post 300, via the attachment channel 330.

Figure 3B:
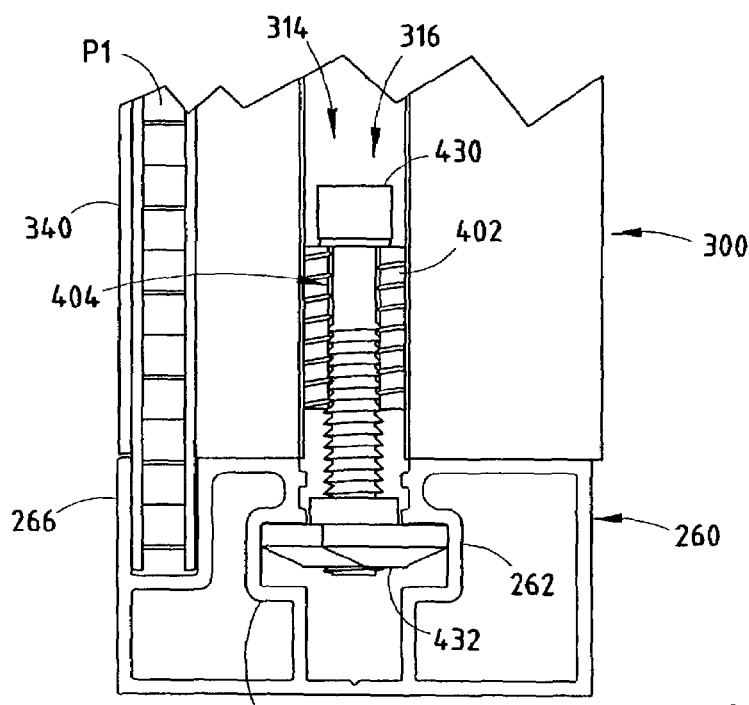
FIG. 3B is a side view of the elongated post of FIG. 3A attached to a floor track, as depicted in FIG. 2B, with a T-bolt fastener and an insert.

FIG. 3B depicts a view of an assembly including the post 300 (see FIG. 3A) attached to the floor track 260 (see FIG. 2B). As is shown, an insert 402, which is installed in the elongated lateral pocket 314, includes an aperture 404, which is sized to prevent a head of a T-bolt 430 from passing through the aperture (i.e., rectangular groove) 404 formed in the insert 402. The slot 316 is sized to receive the head of the T-bolt 430 such that the T-bolt 430, including a threaded T-nut 432, can be positioned into the groove 404 with the T-nut 432 positioned in the central body 262 (T-slot) of the floor track 260. As shown, the track flange 266 retains a panel P1 at a lower edge and a batten 340 is used to affix the panel to the post 300. The post 300 is affixed to the floor track 260 by the T-bolt 430 and the T-nut 432 (see FIG. 4F). Thus, according to this embodiment of the present invention, the insert 402 includes a rectangular groove, which slidingly accepts the body of the T-bolt 430 and is sized to prevent the head of the T-bolt 430 from passing through the aperture 404 when the T-bolt 430 and T-nut 432 are tightened.

Figure 3C:
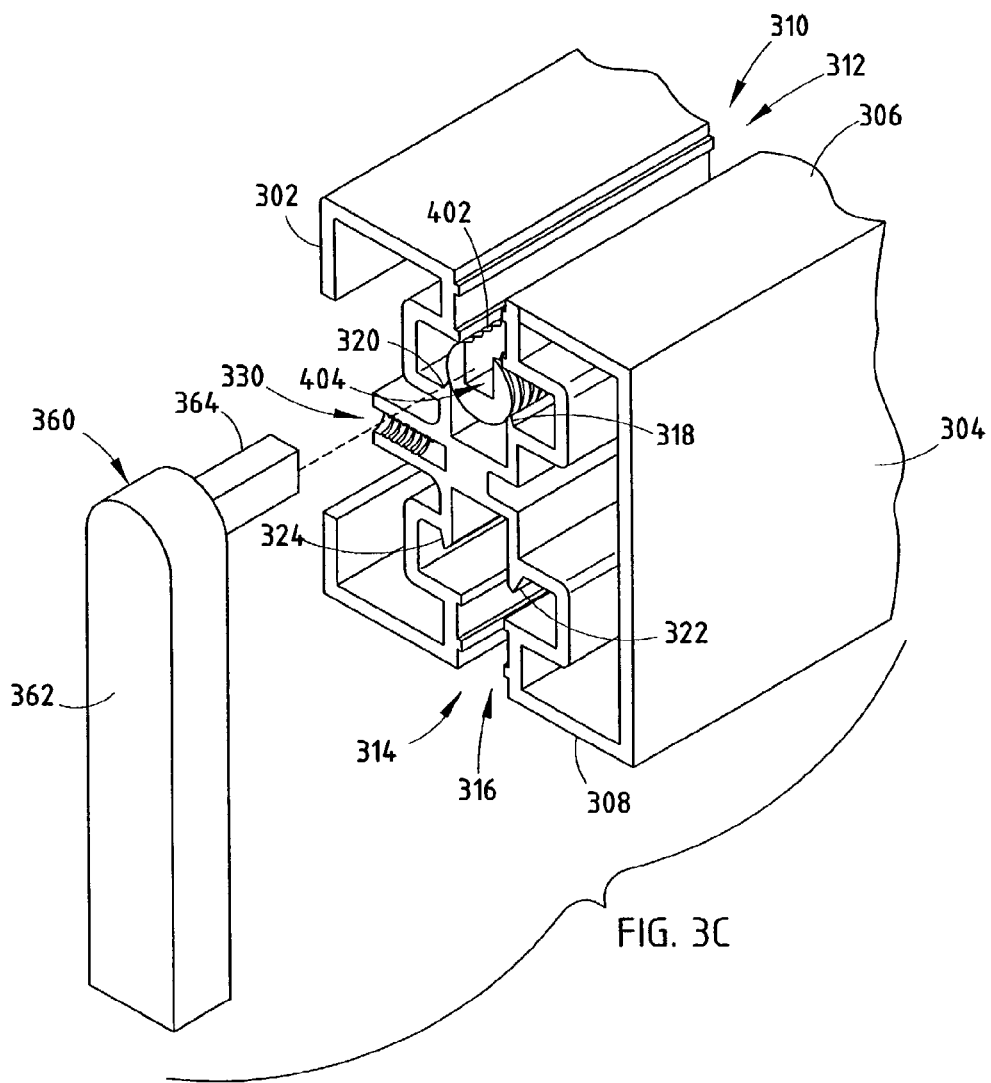
FIG. 3C is an exploded perspective view of the post of FIG. 3A receiving an insert installed with an installation tool, according to an embodiment of the present invention.

FIG. 3C illustrates the insertion of the insert 402 into the pocket 310 formed in the lateral side 306. An insertion tool 360 includes a lever arm 362 with a rectangularly-shaped member 364 located approximate one end of the lever arm 362 and extending substantially perpendicularly from the lever arm 362. The member 362 is sized to be received by the aperture 404 formed in the insert 402, whose outer surface is threaded. The insert 402 is sized to be threadingly received by the pocket 310 as the tool 360 is rotated by an installer to install the insert 402 into the pocket 310. The insert 402 is installed into the pocket 310 such that the insert 402 does not extend beyond an end of the post 300 and the aperture 400 is roughly aligned with the opening 312 in the lateral side 306 to allow a T-bolt 430 to be received in the aperture 404.

Figure 4A:
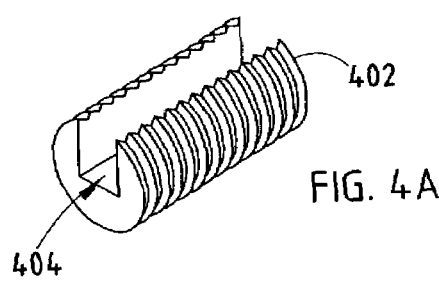
FIGS. 4A-4E are perspective views of various inserts that can be installed within the elongated lateral pockets of the post of FIG. 3A.
Figure 4B:
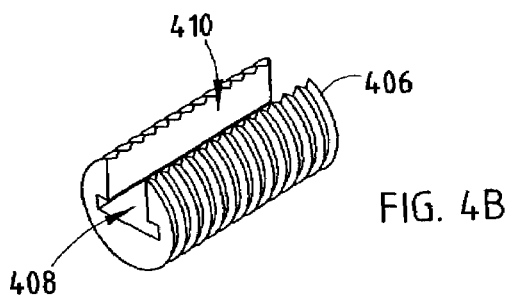
Figure 4C:
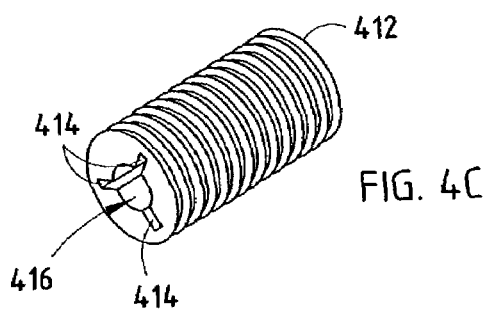
Figure 4D:
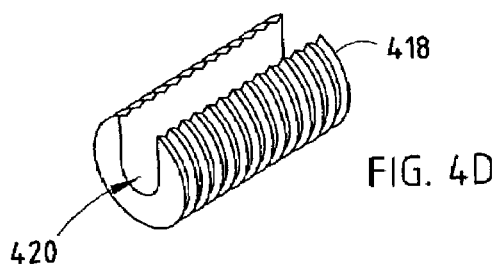
Figure 4E:
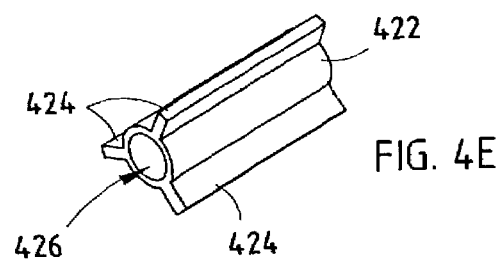
Figure 4F:
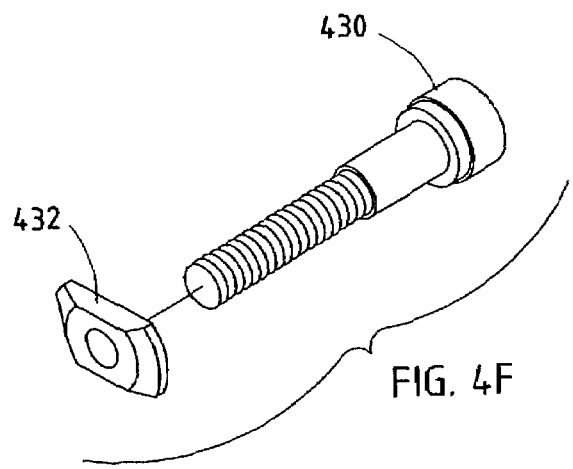
FIG. 4F is a side view of a T-bolt fastener including a T-bolt and a T-nut, according to one embodiment.

FIGS. 4A-4E show a number of exemplary insert configurations. FIG. 4A shows the insert 402, which includes a rectangular-shaped groove 404 and a threaded exterior. FIG. 4B depicts insert 406, which includes a rectangular-shaped slotted groove 408 and a threaded exterior. FIG. 4C shows insert 412, which includes an aperture 416 with installation slots 414 and a threaded exterior. FIG. 4D shows the insert 418, which includes a U-shaped groove 420 and a threaded exterior. The profile of a member of an appropriate insertion tool for the inserts of FIGS. 4A-4D should be readily apparent from the profile of the threaded inserts 402, 406, 412 and 418. Further, the profile of a receiving pocket formed in a post should also be apparent from the profiles of the inserts 402, 406, 412 and 418. Insert 422, shown in FIG. 4E, includes three retaining ribs 424 and an aperture 426. The number of ribs may vary depending upon the profile of the receiving pocket formed in a post and the aperture 426 may be formed as an open groove.

Figure 5A:
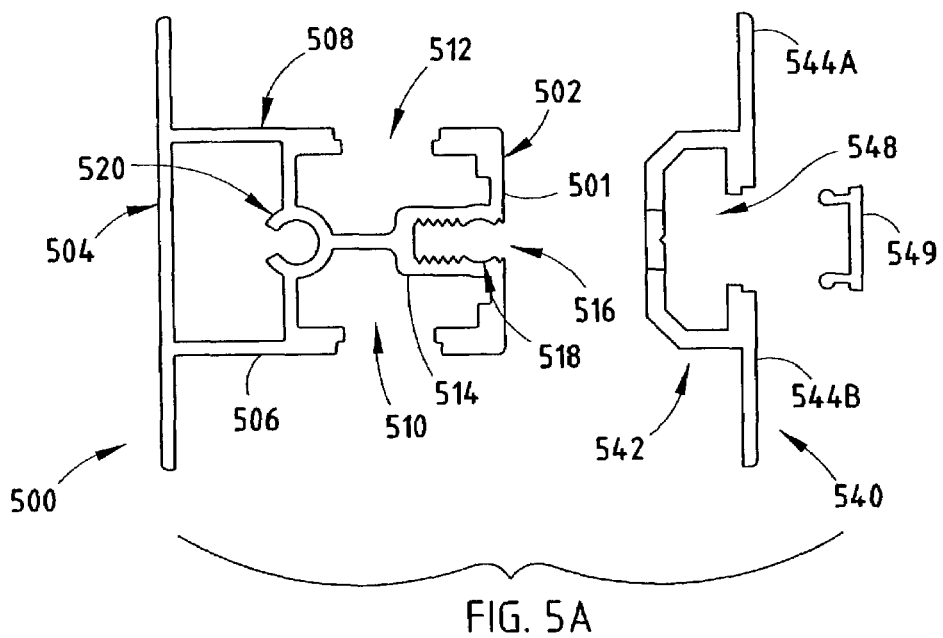
FIG. 5A is a cross-sectional view of an elongated post and an elongated batten, according to yet another embodiment of the present invention.

With reference to FIG. 5A a cross-sectional view of an elongated post 500 and an elongated batten 540, which includes a T-slot 548 formed within a central body 542, which has elongated flanges 544A and 544B extending in opposite directions therefrom, is illustrated. The post 500 has a front side 502, a rear side 504 opposite the front side 502, a first lateral side 506 and a second lateral side 508 opposite the first lateral side 506. A first T-slot 510 is formed in the first lateral side 506 and a second T-slot 512 is formed in the second lateral side 508. The elongated post 500 also includes an integrated attachment rib 514 that is recessed from an outer surface 501 of the front side 502 of the elongated post 500. The integrated attachment rib 514 forms a portion of an inner surface of the T-slots 510 and 512 and includes an attachment channel 516, which opens toward the front side 502 of the elongated post 500.

Figure 5B:
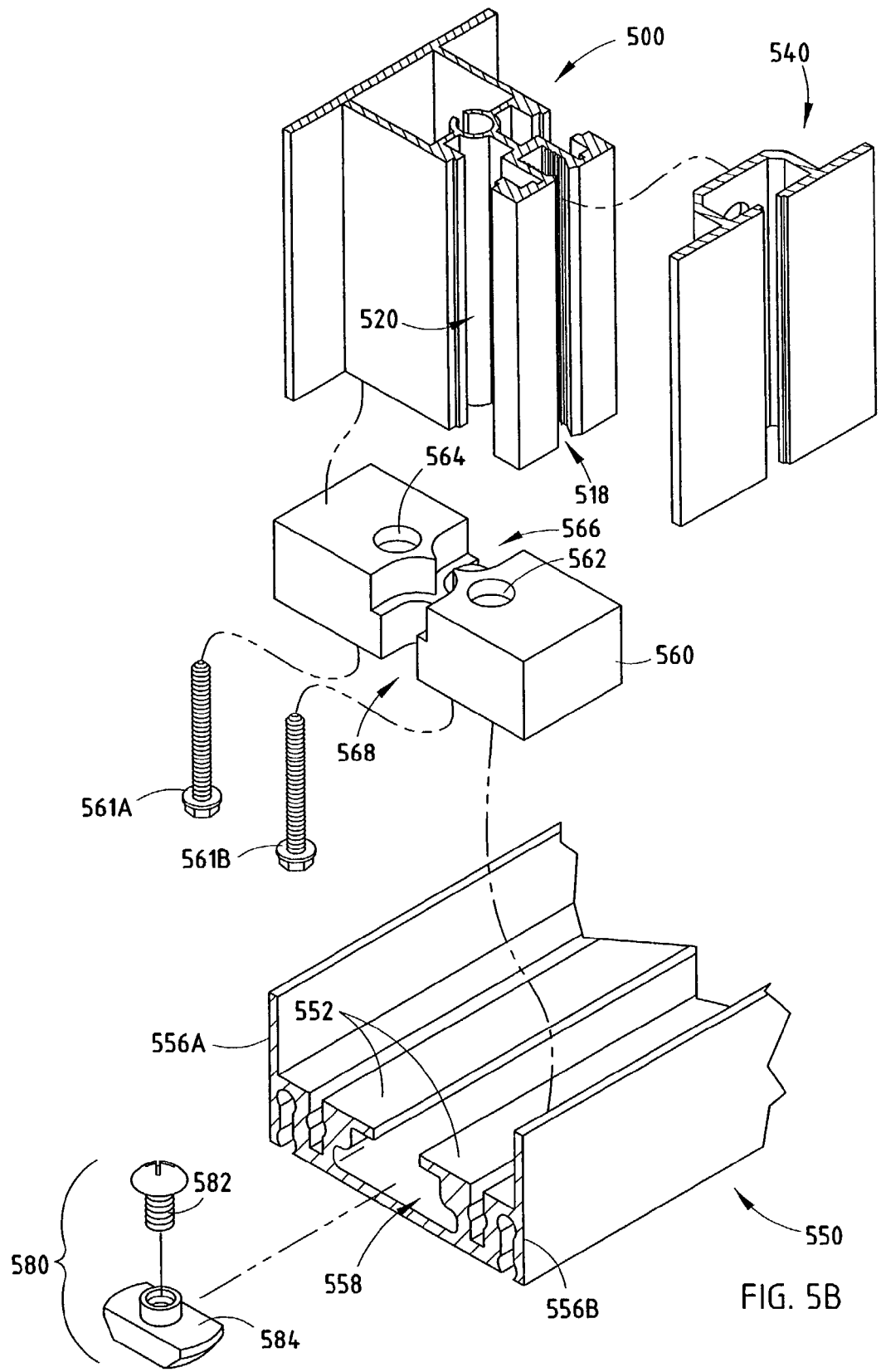
FIG. 5B is an exploded perspective view illustrating the attachment of the post of FIG. 5A to a floor track through the utilization of a connector block and another T-bolt fastener.

The attachment channel 516 receives fasteners to attach the batten 540 to the post 500 and may also receive a fastener 561B in area 518 to affix a mounting block 560 to an end of the post 500 (see FIG. 5B). An aperture 520 is formed in the post 500 to provide another receiving aperture for fastener 561A, which also affixes the mounting block 560 to an end of the post 500.

FIG. 5B illustrates the attachment of the post 500 to a floor track 550 through the utilization of the block 560, the fasteners 561A and 561B and a T-bolt fastener 580, which includes a T-bolt 582 and a T-nut 584. The block 560 includes a pair of shouldered slots 566 and 568 and a pair of apertures 562 and 564, which slidingly receive the fasteners 561A and 561B. The fasteners 561A and 561B are threaded into the aperture 520 and area 518, respectively, to affix the block 560 to an end of the post 500. The shouldered slots 566 and 568 slidingly receive a head of the T-bolt 582, which is threaded into a T-nut 584 that is slidingly received by the T-slot 558 defined by the central body 552 formed in the floor track 550. A pair of opposing floor track flanges 556A and 556B receive the block 560 and panels associated therewith to form a desired wall system.

Figure 5C:
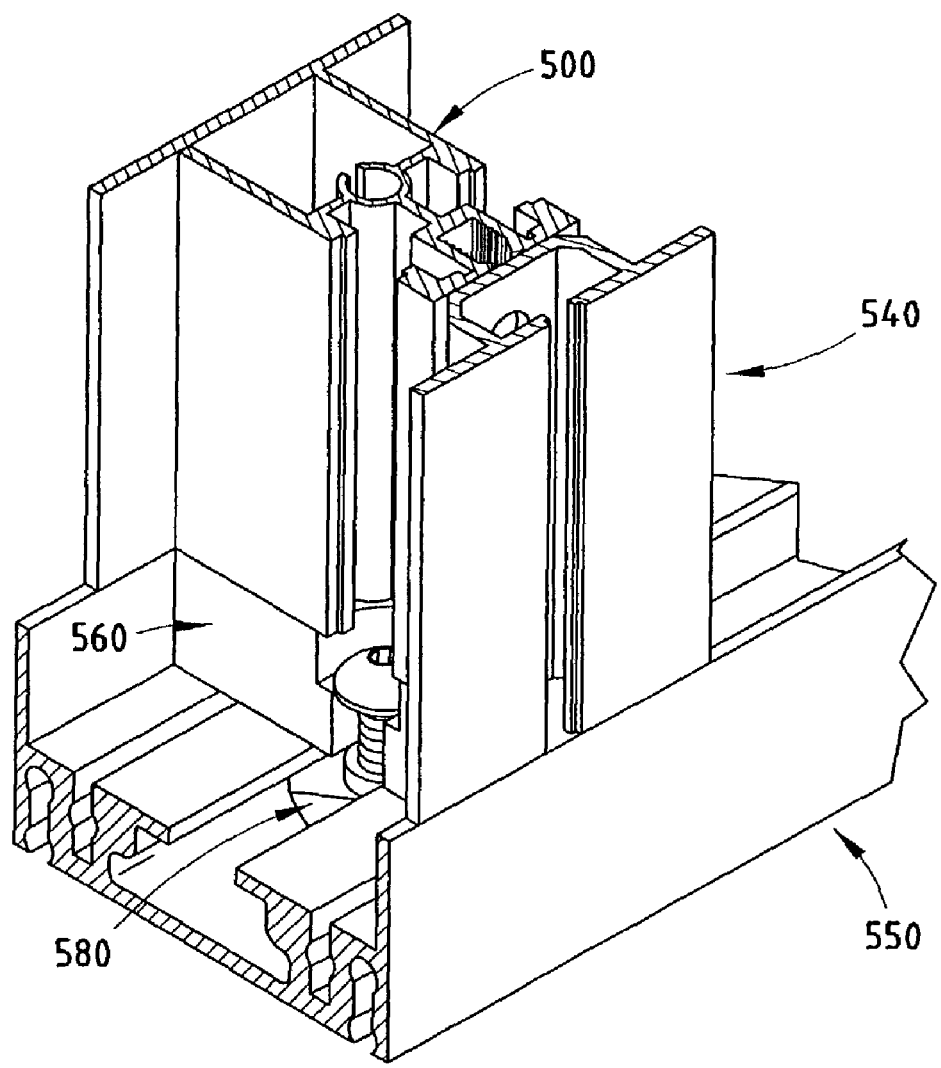
FIG. 5C is a perspective view of an assembly including the components of FIG. 5B.
Figure 5D:
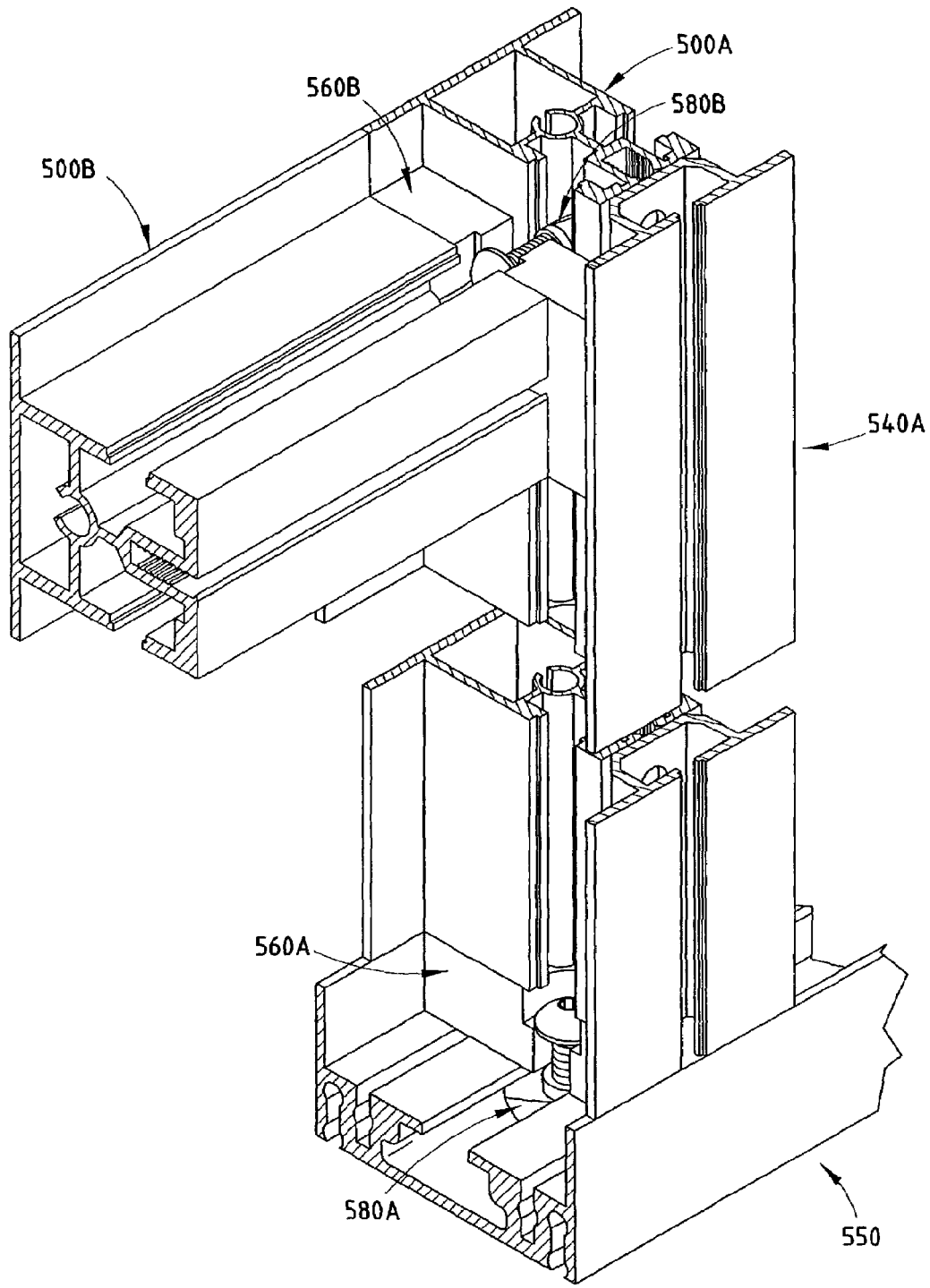
FIG. 5D is a perspective view of an assembly that illustrates post-to-post mounting using a connector block and T-bolt fastener.

FIG. 5C shows the post 500 connected to the floor track 550 with a mounting block 560 and T-bolt fastener 580. FIG. 5D depicts a portion of an exemplary wall system that includes a floor track 550 that is attached to a vertical post 500A, via a mounting block 560A, a pair of fasteners (not shown in FIG. 5D, see FIG. 5B and the fasteners 561A and 561B) and a T-bolt fastener 580A. A horizontal post 500B is orthogonally coupled to the vertical post 500A, via a mounting block 560B, a pair of fasteners (not shown in FIG. 5D, see FIG. 5B and the fasteners 561A and 561B) and T-bolt fastener 580B.

Figure 6A:
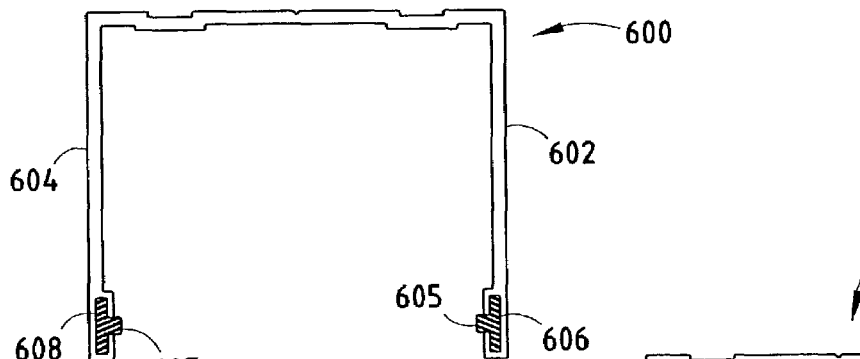
FIGS. 6A-6B are cross-sectional views of header tracks according to different embodiments of the present invention.
Figure 6B:
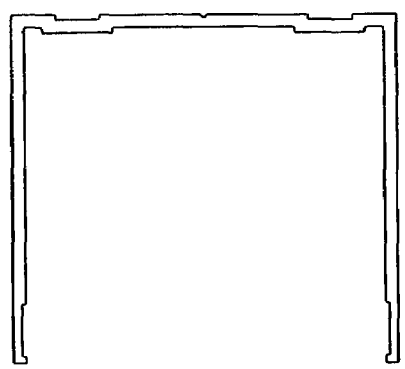

FIGS. 6A-6B are cross-sectional views of elongated U-shaped header tracks 600 and 640, which are constructed for different applications. The header track 600 includes a pair of parallel flanges 602 and 604 that are spaced apart an appropriate width. The flange 602 includes an elongated slot 606 and the flange 604 includes an elongated slot 608 for receiving seals 605 and 607, respectively. The seals 605 and 607, when installed in the slots 606 and 607, serve to seal the top of a wall system. The header track 640 may be utilized when sealing of the top of a wall system is not necessary or another manner of sealing is desired.

Figure 7A:
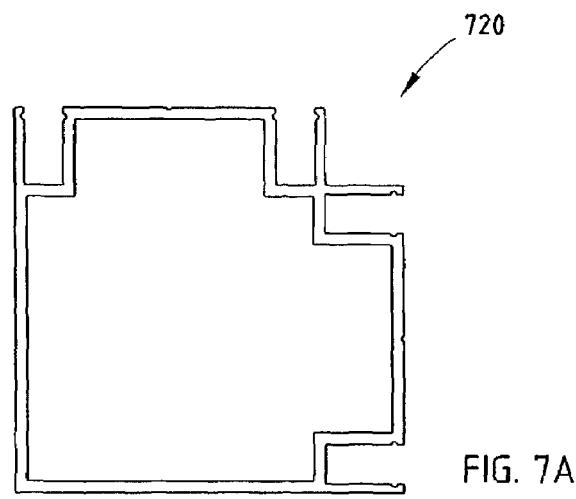
FIGS. 7A-7B are cross-sectional, views of corner posts according to different embodiments of the present invention.
Figure 7B:
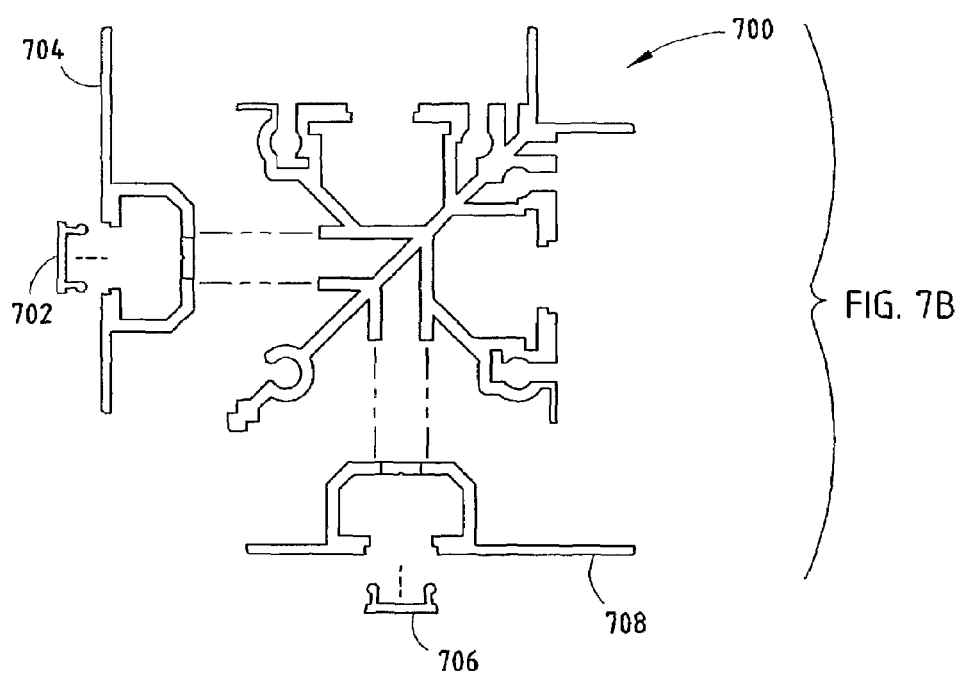

FIGS. 7A-7B are cross-sectional views of corner posts 700 and 720, constructed according to different embodiments of the present invention. The corner post 720 can be utilized with the embodiment disclosed in FIGS. 2A-2E and the corner post 700 may be utilized with the embodiments of FIGS. 3A-3C and FIGS. 5A-5D.

Accordingly, a number of assemblies have been disclosed herein which can advantageously be implemented within a wall system to lower the overall cost of the wall system.

The above description is considered that of the preferred embodiments only. Modification of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the Doctrine of Equivalents.

What is claimed is:

1. An assembly for a framed system, comprising:
an elongated post including:
a front side, a rear side opposite the front side, a first lateral side and a second lateral side opposite the first lateral side, wherein the front and rear sides and the first and second lateral sides define a post channel;
an elongated first rib having a front face and a trailing face opposing the front face integrated along an inner surface of the first lateral side and an elongated second rib having a front face and a trailing face opposing the front face integrated along an inner surface of the second lateral side; and
a mounting plate shaped for installation in the post channel, the mounting plate including an aperture for receiving a fastener, wherein the mounting plate includes a first slot that extends through the mounting plate and that receives the first rib and a second slot that extends through the mounting plate and that receives the second rib, and wherein one of the faces of each of the first and second ribs bears against and is permanently physically deformed by the installation of the mounting plate in the post channel such that the deformed first and second ribs retain the mounting plate in the post channel.

2. The assembly of claim 1, wherein the first and second slots are formed at an angle with respect to a face of the mounting plate.

3. The assembly of claim 2, wherein the angle is between thirty and sixty degrees.

4. The assembly of claim 1, wherein an inner surface of the front side of the elongated post includes an integrated attachment rib which defines an attachment channel which opens to an outer surface of the front side of the elongated post.

5. The assembly of claim 4, wherein the mounting plate includes an attachment slot for receiving the attachment rib when the mounting plate is installed in the post channel of the elongated post.

6. The assembly of claim 4, further including:
an elongated batten having a central body, a pair of batten flanges extending from a front face of the central body in opposite directions and a plurality of apertures for receiving fasteners which thread into the attachment channel of the elongated post and thus affix the elongated batten to the outer surface of the elongated post.

7. The assembly of claim 6, wherein the elongated batten includes an elongated opening in the front face of the central body located between the pair of batten flanges.

8. The assembly of claim 4, wherein the rear side of the elongated post is formed with an elongated rear side opening defined by inwardly extending rear side flanges, and wherein the rear side elongated opening is sized to receive a mounting plate tool for installation of the mounting plate in the post channel.

9. The assembly of claim 4, further including:
a floor track having a floor track central body with a central opening and a floor track flange defining a space for receiving a panel, wherein the central opening of the central body is shaped to receive a T-nut which threadingly receives a T-bolt routed through the aperture in the mounting plate and into the central opening for securing the elongated post to the floor track.

10. An assembly for a framed system, comprising:
an elongated post including a front side, a rear side opposite the front side, a first lateral side and a second lateral side opposite the first lateral side, wherein the front and rear sides and the first and second lateral sides define a post channel; and a mounting plate shaped for installation in the post channel, the mounting plate including at least one of an aperture for receiving a fastener or an integrated threaded stud extending from the mounting plate away from the post channel, wherein a portion of at least one of the elongated post and the mounting plate has first and second opposing engagement faces that permanently physically deform to retain the mounting plate in the post channel at an angle relative to the first lateral side that is different than the angle relative to the first lateral side before said engagement faces are permanently physically deformed; and an attachment slot formed in the mounting plate that engages a portion of the front side of the elongated post.

11. The assembly of claim 10, wherein the elongated post includes an elongated first rib integrated along an inner surface of the first lateral side and an elongated second rib integrated along an inner surface of the second lateral side, and wherein the mounting plate includes a first slot for receiving the first rib and a second slot for receiving the second rib, where the first and second ribs are physically deformed by the installation of the mounting plate in the post channel such that the deformed first and second ribs retain the mounting plate in the post channel.

12. The assembly of claim 10, wherein the elongated post includes a first slot formed in an end of the post on the first lateral side and a second slot formed in the end of the post on the second lateral side, and wherein the mounting plate includes a first tab for insertion into the first slot and a second tab for insertion into the second slot, and where the first and second tabs are physically deformed by the installation of the mounting plate in the post channel such that the deformed first and second tabs retain the mounting plate in the post channel.

13. The assembly of claim 11, wherein the first and second slots are formed at an angle with respect to a face of the mounting plate.

14. The assembly of claim 12, wherein the first and second tabs are formed at an angle with respect to a face of the mounting plate.

15. The assembly of claim 10, wherein an inner surface of the front side of the elongated post includes an integrated attachment rib which defines an attachment channel which opens to an outer surface of the front side of the elongated post.

16. The assembly of claim 15, wherein the mounting plate includes an attachment slot for receiving the attachment rib when the mounting plate is installed in the post channel of the elongated post.

17. The assembly of claim 15, further including:
an elongated batten having a central body, a pair of batten flanges extending from a front face of the central body in opposite directions and a plurality of apertures for receiving fasteners which thread into the attachment channel of the elongated post and thus affix the elongated batten to the outer surface of the elongated post.

18. The assembly of claim 17, wherein the elongated batten includes an elongated opening in the front face of the central body located between the pair of batten flanges.

19. The assembly of claim 10, wherein the rear side of the elongated post is formed with an elongated rear side opening defined by inwardly extending rear side flanges, and wherein the rear side elongated opening is sized to receive a mounting plate tool for installation of the mounting plate in the post channel.

20. The assembly of claim 10, further including:
a floor track having a floor track central body with a central opening and a floor track flange defining a space for receiving a panel, wherein the central opening of the central body is shaped to receive a T-nut which threadingly receives a T-bolt routed through the aperture in the mounting plate and into the central opening for securing the elongated post to the floor track.

21. An assembly for a framed system, comprising:
an elongated post including:
a front side, a rear side opposite the front side, a first lateral side and a second lateral side opposite the first lateral side, wherein the front and rear sides and the first and second lateral sides define a post channel;
an elongated first rib having a front face and a trailing face opposing the front face integrated along an inner surface of the first lateral side and an elongated second rib having a front face and a trailing face opposing the front face integrated along an inner surface of the second lateral side;
a mounting plate shaped for installation in the post channel, the mounting plate including an aperture for receiving a fastener, wherein the mounting plate includes a first slot for receiving the first rib and a second slot for receiving the second rib, and wherein one of the faces of each of the first and second ribs bears against and is permanently physically deformed by the installation of the mounting plate in the post channel such that the deformed first and second ribs retain the mounting plate in the post channel; and
wherein the first and second slots are formed at an angle with respect to a face of the mounting plate; and
wherein the angle is between thirty and sixty degrees.

22. The assembly of claim 21, wherein an inner surface of the front side of the elongated post includes an integrated attachment rib which defines an attachment channel which opens to an outer surface of the front side of the elongated post; and
wherein the mounting plate includes an attachment slot for receiving the attachment rib when the mounting plate is installed in the post channel of the elongated post.

23. The assembly of claim 22, further including:
an elongated batten having a central body, a pair of batten flanges extending from a front face of the central body in opposite directions and a plurality of apertures for receiving fasteners which thread into the attachment channel of the elongated post and thus affix the elongated batten to the outer surface of the elongated post.

24. The assembly of claim 23, wherein the elongated batten includes an elongated opening in the front face of the central body located between the pair of batten flanges.

25. The assembly of claim 22, wherein the rear side of the elongated post is formed with an elongated rear side opening defined by inwardly extending rear side flanges, and wherein the rear side elongated opening is sized to receive a mounting plate tool for installation of the mounting plate in the post channel.

26. The assembly of claim 22, further including:
a floor track having a floor track central body with a central opening and a floor track flange defining a space for receiving a panel, wherein the central opening of the central body is shaped to receive a T-nut which threadingly receives a T-bolt routed through the aperture in the mounting plate and into the central opening for securing the elongated post to the floor track.

27. An assembly for a framed system, comprising:
an elongated post including a front side, a rear side opposite the front side, a first lateral side and a second lateral side opposite the first lateral side, wherein the front and rear sides and the first and second lateral sides define a post channel; and
a mounting plate shaped for installation in the post channel, the mounting plate including at least one of an aperture for receiving a fastener or an integrated threaded stud extending from the mounting plate away from the post channel, wherein a portion of at least one of the elongated post and the mounting plate has first and second opposing engagement faces that permanently physically deform to retain the mounting plate in the post channel;
wherein an inner surface of the front side of the elongated post includes an integrated attachment rib which defines an attachment channel which opens to an outer surface of the front side of the elongated post; and
wherein the mounting plate includes an attachment slot for receiving the attachment rib when the mounting plate is installed in the post channel of the elongated post.

28. The assembly of claim 27, further including:
an elongated batten having a central body, a pair of batten flanges extending from a front face of the central body in opposite directions and a plurality of apertures for receiving fasteners which thread into the attachment channel of the elongated post and thus affix the elongated batten to the outer surface of the elongated post.

29. The assembly of claim 28, wherein the elongated batten includes an elongated opening in the front face of the central body located between the pair of batten flanges.

30. An assembly for a framed system, comprising:
an elongated post including:
a front side, a rear side opposite the front side, a first lateral side and a second lateral side opposite the first lateral side, wherein the front and rear sides and the first and second lateral sides define a post channel; and
an elongated first rib having a front face and a trailing face opposing the front face integrated along an inner surface of the first lateral side and an elongated second rib having a front face and a trailing face opposing the front face integrated along an inner surface of the second lateral side; and
a mounting plate shaped for installation in the post channel, the mounting plate including an aperture for receiving a fastener, wherein the mounting plate includes a first slot that extends through the mounting plate and that receives the first rib, the first slot being formed at a non-perpendicular angle relative to the planar extent of the mounting plate, and a second slot that extends through the mounting plate and that receives the second rib, the second slot being formed at a non-perpendicular angle relative to the planar extent of the mounting plate, and wherein one of the faces of each of the first and second ribs bears against and is permanently physically deformed by the installation of the mounting plate in the post channel such that the deformed first and second ribs retain the mounting plate in the post channel.

\* \* \* \* \*